(12) United States Patent
Lin

(10) Patent No.: US 6,570,344 B2
(45) Date of Patent: May 27, 2003

(54) LAMP GROUNDING AND LEAKAGE CURRENT DETECTION SYSTEM

(75) Inventor: Yung-Lin Lin, Palo Alto, CA (US)

(73) Assignee: O2Micro International Limited, Grand Cayman (KY)

( * ) Notice: Subject to any disclaimer, the term of this patent is extended or adjusted under 35 U.S.C. 154(b) by 33 days.

(21) Appl. No.: 09/850,692

(22) Filed: May 7, 2001

(65) Prior Publication Data
US 2002/0163822 A1 Nov. 7, 2002

(51) Int. Cl.$^7$ .............................................. H05B 41/36
(52) U.S. Cl. ................... 315/224; 315/307; 315/DIG. 5
(58) Field of Search .......................... 315/224, 307, 315/DIG. 7, DIG. 5, 219, 242, 243

(56) References Cited

U.S. PATENT DOCUMENTS

| | | | | |
|---|---|---|---|---|
| 4,240,009 A | * | 12/1980 | Paul | 315/224 |
| 4,464,606 A | | 8/1984 | Kane | 315/158 |
| 4,535,399 A | | 8/1985 | Szepesi | 363/41 |
| 4,541,041 A | | 9/1985 | Park et al. | 363/41 |
| 4,672,528 A | | 6/1987 | Park et al. | 363/98 |
| 4,727,469 A | | 2/1988 | Kammiller | 363/56 |
| 4,794,506 A | | 12/1988 | Hino et al. | 363/25 |
| 4,814,962 A | | 3/1989 | Magalhaes et al. | 363/16 |
| 4,833,584 A | | 5/1989 | Divan | 363/37 |
| 4,855,888 A | | 8/1989 | Henze et al. | 363/17 |
| 4,860,189 A | | 8/1989 | Hitchcock | 363/132 |
| 4,864,483 A | | 9/1989 | Divan | 363/37 |
| 4,912,622 A | | 3/1990 | Steigerwald et al. | 363/98 |
| 4,935,857 A | | 6/1990 | Nguyen et al. | 363/17 |
| 4,952,849 A | | 8/1990 | Fellows et al. | 315/307 |
| 4,953,068 A | | 8/1990 | Henze | 363/17 |
| 4,992,919 A | | 2/1991 | Lee et al. | 363/17 |
| 5,017,800 A | | 5/1991 | Divan | 307/66 |
| 5,027,263 A | | 6/1991 | Harada et al. | 363/16 |
| 5,027,264 A | | 6/1991 | DeDoncker et al. | 363/16 |

(List continued on next page.)

OTHER PUBLICATIONS

"An Introduction to the Principles and Features of Resonant Power Conversion", Steve Freeland, from *Recent Developments in Resonant Power Conversion*, Intertec Communications, Inc., 1998, pp. 20–43.

"Zero–Voltage Switching Technique in DC/DC Converters", Kwang–Hwa Lie and Fred C. Lee, from *Recent Developments in Resonant Power Conversion*, Intertec Communications, Inc., 1988, pp. 211–223.

"A New and Improved Control Technique Greatly Simplifies the Design of ZVS Resonant Inverters and DC/DC Power Supplies", Mehmet K. Nalbant, 1995 IEEE, pp. 694–701.

*Switching Power Supply Design*, Abraham I. Pressman, McGraw–Hill, 1991, pp. 93–104; 471–492.

Phase Shifted, Zero Voltage Transition Design Considerations and the UC3875 PWM Controller, by Bill Andreycak, Unitrode, Application Note, May 1997, pp. 1–14.

"Fixed–Frequency, Resonant–Switched Pulse Width Modulation with Phase–Shifted Control", by Bob Mammano and Jeff Putsch, *Power Supply Design Seminar*, Unitrode, 1991, pp. 5–1 to 5–7.

(List continued on next page.)

*Primary Examiner*—Bao Q. Vu
(74) *Attorney, Agent, or Firm*—Grossman Tucker Perreault & Pfleger, PLLC

(57) ABSTRACT

A common ground system and methodology for one or more loads. In exemplary embodiments, a lamp load is regulated by providing a common ground on the secondary side of the transformer and the load. Lamp regulation is provided, in part, via a current feedback loop provided on the secondary side that is commonly grounded between the bottom of the transformer and the bottom of the lamp through the current feedback loop. In this manner, a feedback signal is developed that includes the leakage current of the lamp.

29 Claims, 5 Drawing Sheets

U.S. PATENT DOCUMENTS

| | | | |
|---|---|---|---|
| 5,105,127 A | 4/1992 | Lavaud et al. ............... | 315/291 |
| 5,113,334 A | 5/1992 | Tuson et al. .................... | 363/25 |
| 5,132,888 A | 7/1992 | Lo et al. ........................ | 363/17 |
| 5,132,889 A | 7/1992 | Hitchcock et al. ............ | 363/17 |
| 5,157,592 A | 10/1992 | Walters ........................ | 363/17 |
| 5,198,969 A | 3/1993 | Redl et al. ..................... | 363/17 |
| 5,208,740 A | 5/1993 | Ehsani ........................ | 363/124 |
| 5,231,563 A | 7/1993 | Jitaru .......................... | 363/98 |
| 5,235,501 A | 8/1993 | Stuart et al. ................... | 363/17 |
| 5,268,830 A | 12/1993 | Loftus, Jr. .................... | 363/17 |
| 5,285,372 A | 2/1994 | Huynh et al. ................ | 363/132 |
| 5,291,382 A | 3/1994 | Cohen .......................... | 363/16 |
| 5,305,191 A | 4/1994 | Loftus, Jr. .................... | 363/17 |
| 5,363,020 A | 11/1994 | Chen et al. ............. | 315/209 R |
| 5,384,516 A | 1/1995 | Kawabata et al. .......... | 315/160 |
| 5,394,064 A | 2/1995 | Ranganath et al. ......... | 315/209 |
| 5,402,329 A | 3/1995 | Wittenbreder, Jr. .......... | 363/16 |
| 5,408,162 A * | 4/1995 | Williams ..................... | 315/224 |
| 5,412,557 A | 5/1995 | Lauw ........................... | 363/37 |
| 5,418,703 A | 5/1995 | Hitchcock et al. ............ | 363/17 |
| 5,420,779 A | 5/1995 | Payne .......................... | 363/56 |
| 5,422,546 A | 6/1995 | Nilssen ........................ | 315/219 |
| 5,430,632 A | 7/1995 | Meszlenyi .................... | 363/17 |
| 5,430,641 A | 7/1995 | Kates .......................... | 363/133 |
| 5,448,155 A | 9/1995 | Jutras .......................... | 323/285 |
| 5,448,467 A | 9/1995 | Ferreira ....................... | 363/17 |
| 5,481,160 A | 1/1996 | Nilssen .................. | 315/209 R |
| 5,510,974 A | 4/1996 | Gu et al. ..................... | 363/134 |
| 5,514,921 A | 5/1996 | Steigerwald ................ | 307/125 |
| 5,546,300 A | 8/1996 | Lee et al. ................... | 363/132 |
| 5,559,395 A | 9/1996 | Venkitasubrahmanian et al. ........................... | 315/247 |
| 5,559,688 A | 9/1996 | Pringle ......................... | 363/89 |
| 5,583,402 A | 12/1996 | Moisin et al. .............. | 315/307 |
| 5,615,093 A | 3/1997 | Nalbant ....................... | 363/25 |
| 5,619,106 A * | 4/1997 | Secen ......................... | 315/290 |
| 5,619,402 A | 4/1997 | Liu .............................. | 363/20 |
| 5,638,260 A | 6/1997 | Bees ........................... | 363/17 |
| 5,646,836 A | 7/1997 | Sadarnac et al. ............. | 363/98 |
| 5,669,238 A | 9/1997 | Devers ......................... | 62/657 |
| 5,684,683 A | 11/1997 | Divan et al. .................... | 33/65 |
| 5,694,007 A | 12/1997 | Chen .......................... | 315/247 |
| 5,712,533 A | 1/1998 | Corti .......................... | 315/169.3 |
| 5,715,155 A | 2/1998 | Shahani et al. ............. | 363/132 |
| 5,719,474 A | 2/1998 | Vitello ........................ | 315/307 |
| 5,731,652 A | 3/1998 | Shimada ..................... | 310/316 |
| 5,736,842 A | 4/1998 | Jovanovic .................... | 323/222 |
| 5,742,495 A | 4/1998 | Barone ........................ | 363/65 |
| 5,742,496 A | 4/1998 | Tsutsumi ..................... | 363/95 |
| 5,744,915 A | 4/1998 | Nilssen .................. | 315/209 R |
| 5,748,457 A | 5/1998 | Poon et al. ................... | 363/16 |
| 5,764,494 A | 6/1998 | Schutten et al. ............. | 363/17 |
| 5,767,630 A * | 6/1998 | Williams ..................... | 315/224 |
| 5,774,346 A | 6/1998 | Poon et al. .................... | 363/17 |
| 5,781,418 A | 7/1998 | Chang et al. ................. | 363/16 |
| 5,781,419 A | 7/1998 | Kutkut et al. ................. | 363/17 |
| 5,784,266 A | 7/1998 | Chen .......................... | 363/16 |
| 5,796,598 A | 8/1998 | Nowak et al. ................ | 363/37 |
| 5,818,172 A | 10/1998 | Lee .............................. | 315/86 |
| 5,834,889 A | 11/1998 | Ge .............................. | 313/493 |
| 5,844,378 A | 12/1998 | LoCascio et al. ........... | 315/307 |
| 5,844,540 A | 12/1998 | Terasaki ..................... | 345/102 |
| 5,854,617 A | 12/1998 | Lee et al. .................... | 345/102 |
| 5,856,916 A | 1/1999 | Bonnet ........................ | 363/20 |
| 5,875,103 A | 2/1999 | Bhagwat et al. .............. | 363/17 |
| 5,880,940 A | 3/1999 | Poon ........................... | 363/20 |
| 5,886,477 A | 3/1999 | Honbo et al. ......... | 315/209 PZ |
| 5,886,884 A | 3/1999 | Baek et al. .................. | 363/48 |
| 5,894,412 A | 4/1999 | Faulk .......................... | 363/56 |
| 5,900,700 A | 5/1999 | Arndt et al. ................ | 315/291 |
| 5,910,709 A | 6/1999 | Stevanovic et al. ......... | 315/225 |
| 5,917,722 A | 6/1999 | Singh ........................ | 363/132 |
| 5,923,129 A * | 7/1999 | Henry ........................ | 315/219 |
| 5,930,121 A | 7/1999 | Henry ......................... | 363/16 |
| 5,932,976 A | 8/1999 | Maheshwari et al. ....... | 315/291 |
| 5,939,830 A | 8/1999 | Praiswater ............. | 315/DIG. 4 |
| 5,946,200 A | 8/1999 | Kim et al. .................... | 363/17 |
| 5,982,110 A * | 11/1999 | Gradzki ...................... | 315/247 |
| 6,011,357 A * | 1/2000 | Gradzki et al. ............. | 315/224 |
| 6,011,360 A | 1/2000 | Gradzki et al. ............. | 315/244 |
| 6,114,814 A | 9/2000 | Shannon et al. ............ | 315/219 |
| 6,127,785 A * | 10/2000 | Williams ..................... | 315/224 |
| 6,310,444 B1 * | 10/2001 | Chang .................... | 315/209 R |
| 6,411,040 B1 * | 6/2002 | Ertl et al. .................. | 307/10.8 |

OTHER PUBLICATIONS

"Zero Voltage Switching Resonant Power Conversion", by Bill Andreycak, from *Power Supply Design Seminar*, Unitrode, 1991, pp. A2–1 to A2–24; and A2–1A to A2–3A.

"Resonant Mode Converter Topologies", by Bob Mammano, from *Power Supply Design Seminar*, Unitrode, 1991, pp. P3–1 to P3–12.

"The New UC3879 Phase–Shifted PWM Controller Simplifies the Design of Zero Voltage Transition Full–Bridge Converters", by Laszlo Balogh, Unitrode, Application Note, 1995, pp. 1–8.

"A Comparative Study of a Class of Full Bridge Zero–Voltage–Switched PWM Converters", by W. Chen et al., 1995 IEEE, pp. 893–899.

"Optimum ZVS Full–Bridge DC/DC Converter with PWM Phase–Shift Control; Analysis, Design Considerations, and Experimental Results", by Richard Red I et al., 1994 IEEE, pp. 159–165.

"A Frequency/PWM Controlled Converter with Two Independently Regulated Outputs", by R.A. Fisher et al., HFPC, May 1989, pp. 459–471.

"High Density Power–Hybrid Design of a Half–Bridge Multi–Resonant Converter", by Richard Farrington, et al., HFPC–Virginia Polytechnic Institute, May 1990, pp. 26–33.

"Small–Signal Analysis of the Zero–Voltage Switched Full–Bridge PWM Converter", V. Vlatkovic et al., HFPC–Virginia Polytechnic Institute, May 1990, pp. 262–272.

"Feasible Characteristic Evaluations of Resonant Tank PWM Inverter–Linked DC–DC HIgh–Power Converters for Medical–Use High–Voltage Application", by H. Takano et al., 1995 IEEE, pp. 913–919.

* cited by examiner

LAMP GROUNDING AND LEAKAGE CURRENT DETECTION SYSTEM

BACKGROUND OF THE INVENTION

1. Field of the Invention

The present invention relates to grounding techniques and leakage current detection techniques for lamps associated with LCD display panels. Also, this invention relates to the reliable ignition technique for each lamp in a multiple lamp system. In particular, the present invention relates to a common grounding technique utilizing the metallic chassis of the LCD panel to insure that leakage current of individual lamps is detected to provide more accurate current feedback control. Particular utility for the present invention is in LCD display panels with multiple CCFL lamps, although the present invention is equally applicable in single lamp and multiple lamp environments including lamps other than CCFL type.

2. Description of Related Art

FIG. 1 depicts a conventional Royer circuit that is used to drive multiple CCFL lamps shown as CCFL1 . . . CCFLN. The operational characteristics of the controller and the Royer Is circuit comprised of switches Q1 and Q2 on the primary side of the transformer T1 are well known to those skilled in the art. Each of the CCFLs, CCFL1 . . . CCFLN, and in particular the bottom portions thereof are tied together and are coupled to the rectifier diodes and across the sense resistor R to a virtual ground as depicted. Importantly, the secondary side of the transformer T1 is also coupled to the circuit virtual ground. Virtual grounding techniques are widely used in panel manufacturing and dc/ac inverter manufacturing, since virtual grounding takes advantage of lower potentials needed for a ground without the need for additional wiring. However, the drawback to using virtual grounding techniques is that the leakage current developed within the lamp cannot be detected through the current feedback loop across $R_s$. As is well understood in the art, CCFLs may be equivalently drawn as lumped parasitic capacitance to represent the parasitic capacitor between the CCFLs and the LCD display panel.

FIGS. 2A and 2B depict the secondary side operation of the circuit of FIG. 1 during the negative and positive half-cycles, respectively, of the AC signal developed by the transformer. In FIG. 2A, since the bottom of the secondary side of the transformer is tied to chassis ground, the total current $I_T$ flows through the bottom of the lamp. Importantly, the leakage current $I_{Lk}$ (along the current path represented by leakage capacitor $C_{Lk}$, also tied to ground) flows out of the lamp. At the top of the lamp, the current going back to the top of the transformer is reduced by the value of the leakage current, i.e., $I_T - I_{Lk}$. Thus, the controller cannot regulate the lamp based on the total current that includes the leakage current, since this current is lost to ground. Similarly, in FIG. 2A (positive half cycle), the feedback current developed across the sense resistor is reduced by the leakage current.

Thus, there exists a need for a circuit construction that ensures that lamp regulation is based on the total current delivered to the load, inclusive of the leakage current.

SUMMARY OF THE INVENTION

Accordingly, one embodiment of the present invention provides a common ground circuit, comprising: a transformer having a primary side and a secondary side, said secondary side having a top and a bottom; a lamp having a top, a bottom and a leakage current path, said lamp coupled in parallel to said secondary side of said transformer, said top of said secondary side electrically coupled to said top of said lamp; a common ground connected to a ground node; and a current feedback loop generating a current feedback signal proportional to the total current delivered to said lamp; said bottom side of said transformer electrically coupled to said ground node through said current feedback loop, said bottom of said lamp electrically coupled to said ground node and said leakage current path electrically coupled to said ground node.

The present invention also provides a lamp regulating circuit, comprising a DC to AC inverter circuit generating and an AC signal from a DC source; and a secondary-side transformer circuit, comprising: a transformer having a primary side and a secondary side, said secondary side having a top and a bottom; a lamp having a top, a bottom and a leakage current path, said lamp coupled in parallel to said secondary side of said transformer, said top of said secondary side electrically coupled to said top of said lamp; a common ground; and a current feedback loop generating a current feedback signal proportional to the total current delivered to said lamp; said bottom side of said transformer electrically coupled to said common ground through said current feedback loop, said bottom of said lamp electrically coupled to said common ground and said leakage current path electrically coupled to said common ground.

Still further, the present invention provides a transformer circuit, comprising: a transformer having a primary side and a secondary side, said secondary side having a top and a bottom; a lamp having a top, a bottom and a leakage current path, said lamp coupled in parallel to said secondary side of said transformer, said top of said secondary side electrically coupled to said top of said lamp; a common ground connected to a ground node; and a current feedback loop generating a current feedback signal proportional to the total current delivered to said lamp; said bottom side of said transformer electrically coupled to said ground node through said current feedback loop, said bottom of said lamp electrically coupled to said ground node and said leakage current path electrically coupled to said ground node; wherein at least a portion of energy delivered by said transformer causing said total lamp current to flow from said bottom of said transformer through said current feedback loop to said common ground, a lamp current portion of said total lamp current flows from said common ground through said lamp, and a leakage current portion of said total lamp current flows from said common ground through said leakage current path.

In method form, the present invention provides a common grounding method, comprising: coupling a top side of a transformer to a top side of a lamp; coupling a common ground to a ground node; and coupling a feedback loop circuit to a bottom side of said transformer coupled to and to said ground node; coupling the bottom of said lamp said ground node; and coupling a leakage current path from said lamp to said ground node.

It will be appreciated by those skilled in the art that although the following Detailed Description will proceed with reference being made to preferred embodiments and methods of use the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 3 depicts a lamp controlling system according to one exemplary embodiment of the present invention;

DETAILED DESCRIPTION OF EXEMPLARY EMBODIMENTS

Figure 3:
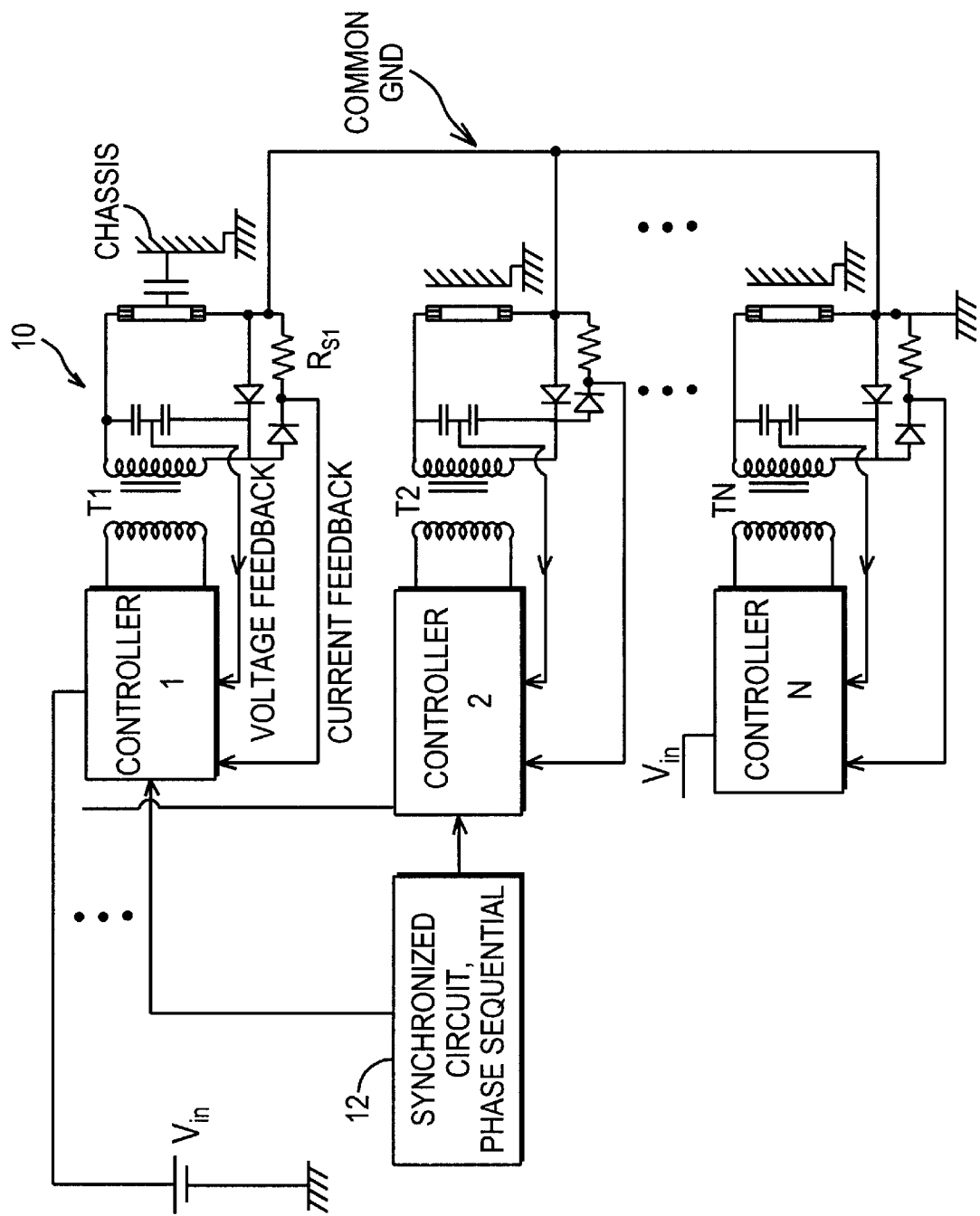
FIG. 3 depicts
Figure 4:
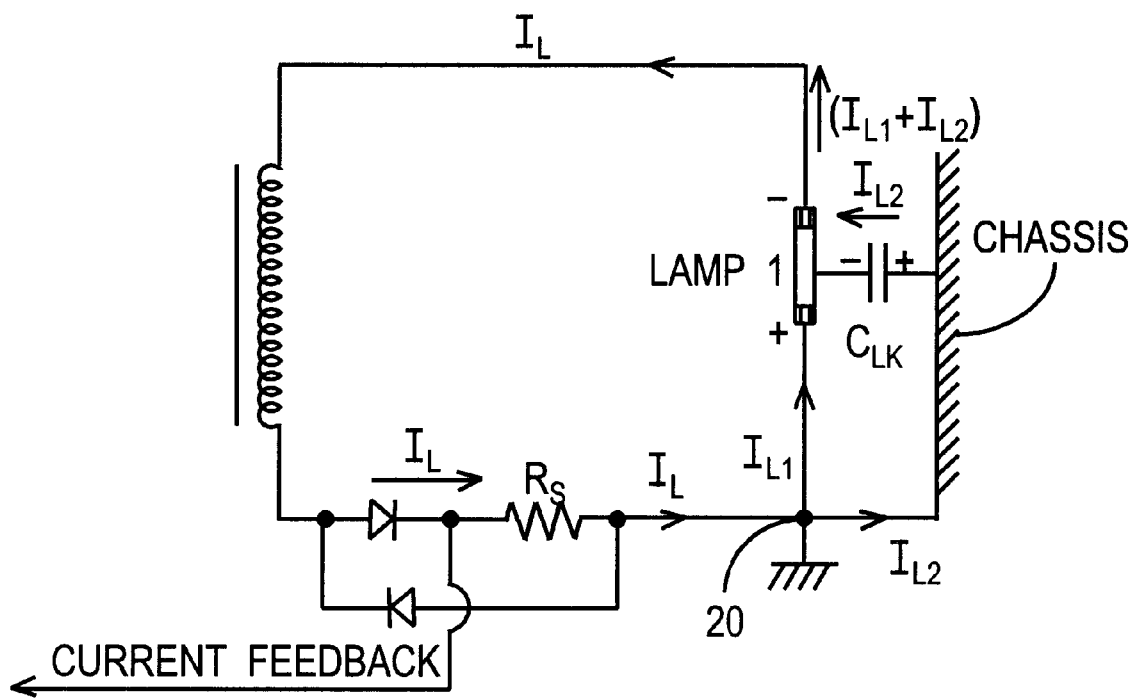
FIG. 4 depicts the operation of the circuit of FIG. 3 during the negative half cycle.

FIG. 3 depicts a lamp controlling system 10 according to one exemplary embodiment of the present invention. In the exemplary embodiment of FIG. 3 a plurality of controllers Controller 1, Controller 2, . . . Controller N are provided for independent control of a plurality of respective lamps Lamp 1, Lamp 2, . . . Lamp N. The specifics of the controller are not important for understanding the present invention, and may be comprised of a push pull-type Royer circuit as disclosed in FIG. 1, a half-bridge inverter, a full-bridge/H-bridge inverter or other inverter topologies known in the art sufficient to drive the transformer T1, T2 . . . TN with an AC signal from the DC voltage $V_n$. In this exemplary embodiment, each lamp is coupled to the chassis ground via the leakage capacitance $C_{Lk}$ of the lamp (FIG. 4.) The chassis may comprise a system ground. Voltage feedback and current feedback are provided for controllable operation of the lamp in a manner well understood in the art.

Figure 1:
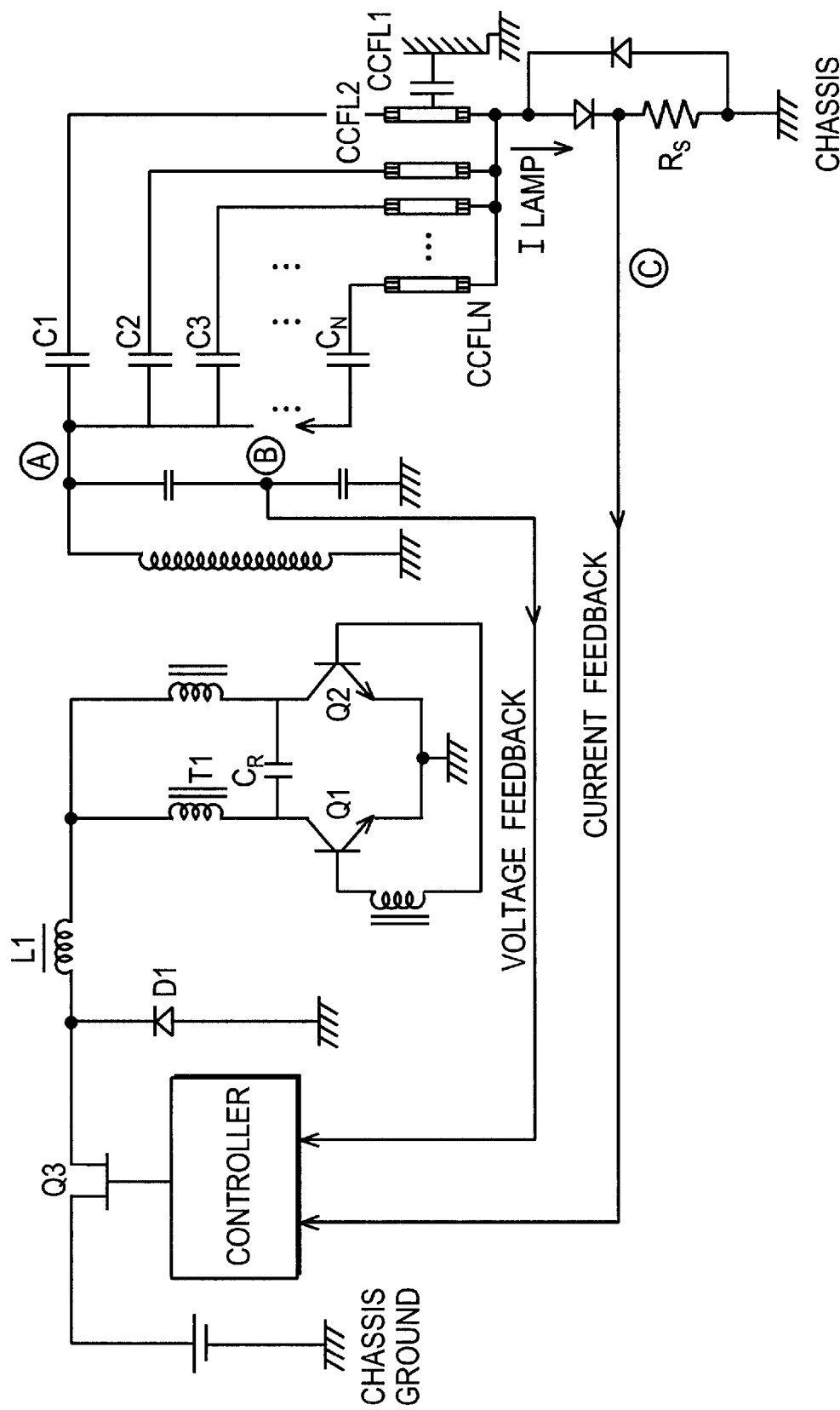
FIG. 1 depicts a circuit diagram of a conventional inverter topology for driving a lamp load.
Figure 2A:
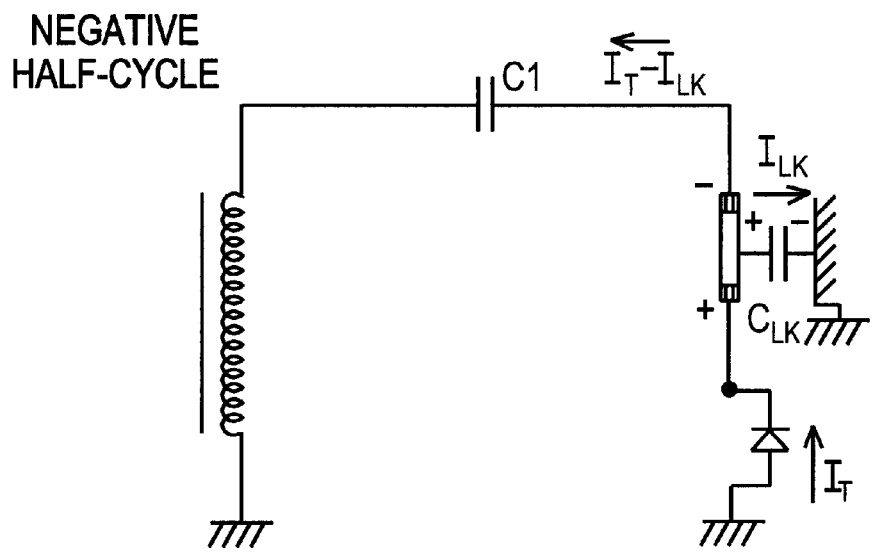
FIGS. 2A and 2B depict the operation of the conventional circuit of FIG. 1 during the negative and positive half cycles, respectively.
Figure 2B:
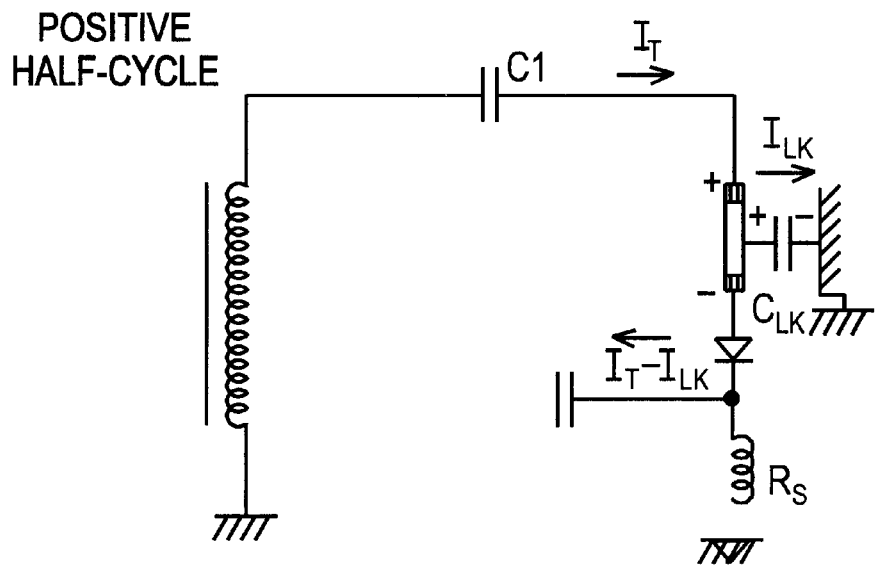

Unlike the grounding structure disclosed in FIGS. 1, 2A and 2B, the present exemplary embodiment provides a common ground coupled to each feedback loop, defined by the diodes and sense resistor $R_{s1}$. Also, the bottom of the transformer is coupled to the common ground through the feedback loop. It should be noted at the outset that although the exemplary embodiment of FIG. 3 depicts a plurality of lamps driven by a plurality of controllers, the present invention is equally applicable to single lamp environments where one controller drives a transformer to supply power to a single lamp. The topology depicted in FIG. 3 provides a current sensing technique that permits the current feedback line to detect leakage current developed across the lamp and the chassis to provide more accurate power control of the lamp.

FIG. 4 depicts an exemplary circuit diagram of the secondary side of the transformer, the lamp, and the common ground technique according to the exemplary embodiment of the present invention. Shown in detail if FIG. 4, the secondary side of the transformer is coupled to the common ground (chassis ground) through the feedback loop and to the lamp as shown. During the negative half-cycle of an AC signal developed across the secondary side of the transformer the circuit depicted in FIG. 4 operates as follows. A total current $I_L$ flows through the diode and sense resistor $R_s$ into the common ground node 20. A portion of the total current, $I_{L1}$ flows into the lamp from node 20. Unlike the embodiment depicted in FIGS. 1, 2A and 2B, a portion of the total current, $I_{L2}$ flows into the common ground chassis and through the equivalent leakage capacitor $C_{Lk}$. Since the common ground chassis develops a higher potential than the side of the equivalent capacitor $C_{Lk}$ closest to the lamp, the leakage current $I_{L2}$ flows from the chasse and into the lamp. Coming out of the lamp is a total current represented by $I_{L1}+I_{L2}$, which current flows through sense resistor $R_s$. Thus, the current feedback, which is used to provide closed-loop control of power delivered to the lamp, is a reflection of both the lamp current $I_{L1}$ and the leakage current $I_{L2}$. In other words, the common ground circuit according to this exemplary embodiment includes the secondary side of a transformer where the secondary said has a top and a bottom. The lamp also has a top and a bottom, as well as a leakage current path. The lamp is coupled in parallel to the secondary side where the top of said secondary side is electrically coupled to the top of the lamp. A common ground is provided that is connected to a ground node. A current feedback loop is provided that generates a current feedback signal proportional to the total current delivered to the lamp. From a nodal analysis standpoint, the common ground technique is accomplished by coupling the bottom side of the secondary side to said ground node through the current feedback loop, coupling the bottom of the lamp to the ground node and coupling the leakage current path to the ground node.

For a given lamp, the leakage current can represent as much as 10 to 20% of the total current drawn by the lamp, and is conventionally not considered for control of the lamp, since it does not flow through the sense resistor Rs (as shown in FIGS. 1, 2A and 2B). Moreover, during the operational life of the lamp, the value of $C_{Lk}$, and hence the value of the leakage current can change. By virtue of the common grounding technique provided by the exemplary embodiment of the present invention, the controller receives a complete picture of the current draw of the lamp load, including the leakage current thereby providing more efficient and accurate control of the lamp. Thus, the lamp can be regulated based on the total current drawn by the lamp load, inclusive of the leakage current, rather than just the current flowing out of the lamp, as provided in the prior art.

Referring again to the system diagram of FIG. 3, a sequential phase synchronizing circuit 12 is provided. Circuit 12 sequentially activates each controller Controller 1, Controller 2 . . . Controller N in a phased manner to minimize input ripple current, so that all the lamps do not ignite at once. The operation of this topology is provided in application Ser. No. 09/757,265 filed Jan. 9, 2001 entitled "Sequential Burst Mode Activation Circuit", and assigned to the same assignee. The '265 application number is hereby incorporated by reference in its entirety as disclosing exemplary circuitry and control methodology for the circuit 12. The circuit of FIG. 3 also depicts an independent voltage feedback loop (voltage F.B.). This voltage feedback loop ensures controller to supply sufficient ignition voltage to each CCFL as well as providing sufficient protection if the CCFL load is operating in an open loop condition (e.g., lamp missing or damaged). In the prior art, as shown in FIG. 1, since all CCFLs are coupled through a transformer, a voltage feedback loop in FIG. 1 will not provide individual CCFL ignition. Thus, the present invention also provides individual CCFL ignition for a plurality of lamps.

Figure 5:
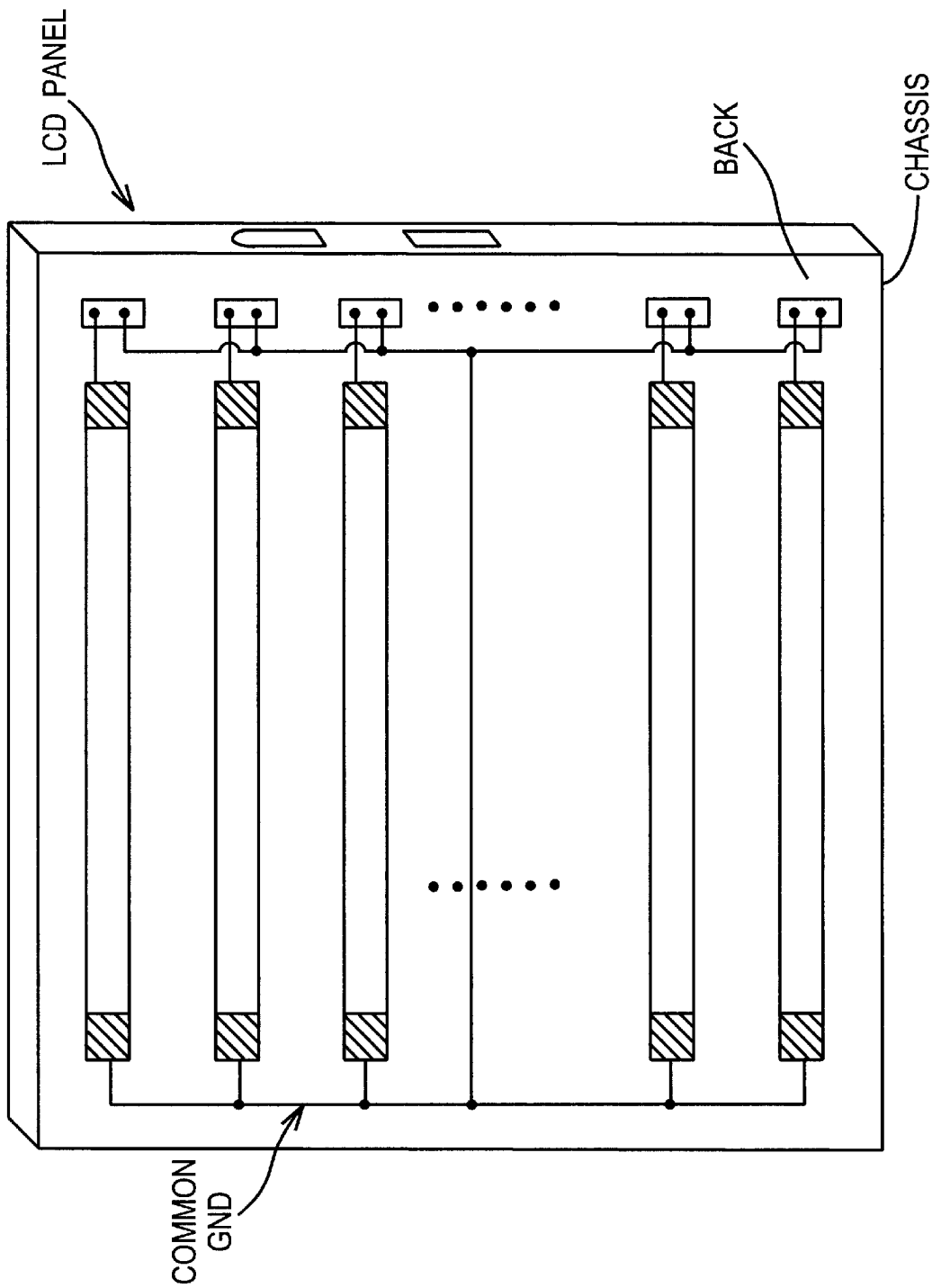
FIG. 5 depicts a multiple lamp, common grounding technique in an LCD panel according to one exemplary embodiment of the present invention.

FIG. 5 depicts a multiple lamp, common grounding technique in an LCD panel according to one exemplary embodiment of the present invention. Each lamp is tied together to a common ground (as shown on the left side of FIG. 5), which is also reflected in the power connection shown on the right side. Connection in this manner obtains the advantages described in detail above, i.e., lamp control based on total lamp load current and multiple independent lamp operation.

Those skilled in the art will recognize that numerous modifications may be made to the present invention, without departing from the spirit or scope thereof. For example, the topologies of FIGS. 3 and 4 provide a current feedback signal that is indicative of the total current drawn by the lamp load including the lamp current and leakage current as described in detail above. Those skilled in the art will recognize that additional feedback lines may be added to the topology to provide quantitative analysis of the individual current draws of the lamp load. For example, referring again to FIG. 4, the common grounding topology may be adapted with an additional current feedback line coupled to the positive node of the lamp (during the negative half-cycle depicted) between node 20 and the lamp, thereby providing a feedback signal proportional to the current draw of the lamp. Likewise, an additional feedback line may be coupled to the path of the leakage current $I_{L2}$ to provide a quantitative signal proportional to the value of the leakage current.

Still other modifications may be made. For example, although the detailed description herein describes the earth ground reference for the common grounding technique as the metallic chasse of the LCD panel, the present invention is not limited to this particular ground. For a given application, other grounds may be available and may be likewise utilized by the present invention.

What is claimed is:

1. An common ground circuit, comprising:
   a transformer having a primary side and a secondary side, said secondary side having a top and a bottom;
   a lamp having a top, a bottom and a leakage current path, said lamp coupled in parallel to said secondary side of said transformer, said top of said secondary side electrically coupled to said top of said lamp;
   a common ground connected to a ground node; and
   a current feedback loop generating a current feedback signal proportional to the total current delivered to said lamp;
   said bottom side of said transformer electrically coupled to said ground node through said current feedback loop, said bottom of said lamp electrically coupled to said ground node and said leakage current path electrically coupled to said ground node.

2. A circuit as claimed in claim 1, wherein at least a portion of power delivered by said transformer causing said total lamp current to flow from said bottom of said transformer through said current feedback loop to said common ground, a lamp current portion of said total lamp current flows from said common ground through said lamp, and a leakage current portion of said total lamp current flows from said common ground through said leakage current path.

3. A circuit as claimed in claim 1, wherein said total current delivered to said lamp comprises a lamp current and a leakage current.

4. A circuit as claimed in claim 2, wherein said lamp current portion and said leakage current portion summing together at the top of said lamp and totaling said total lamp current.

5. A circuit as claimed in claim 1, wherein said leakage current path comprising a leakage capacitance generated by said lamp coupled to said common ground node.

6. A circuit as claimed in claim 1, wherein said current feedback loop comprising a first diode biased away from said bottom of said secondary side, a sense resistor between said first diode and said common node, and a second diode biased toward said bottom of said secondary side in parallel with said first diode and said sense resistor.

7. A circuit as claimed in claim 2, wherein said portion of said power comprising the negative half-cycle of the AC signal generated by said secondary side.

8. A circuit as claimed in claim 1, wherein said common ground comprising a system circuit ground.

9. A lamp regulating circuit, comprising
   a DC to AC inverter circuit generating and an AC signal from a DC source; and
   a secondary-side transformer circuit, comprising:
   a transformer having a primary side and a secondary side, said secondary side having a top and a bottom;
   a lamp having a top, a bottom and a leakage current path, said lamp coupled in parallel to said secondary side of said transformer, said top of said secondary side electrically coupled to said top of said lamp;
   a common ground; and
   a current feedback loop generating a current feedback signal proportional to the total current delivered to said lamp;
   said bottom side of said transformer electrically coupled to said common ground through said current feedback loop, said bottom of said lamp electrically coupled to said common ground and said leakage current path electrically coupled to said common ground.

10. A circuit as claimed in claim 9, wherein at least a portion of energy delivered by said transformer causing said total lamp current to flow from said bottom of said transformer through said current feedback loop to said common ground, a lamp current portion of said total lamp current flows from said common ground through said lamp, and a leakage current portion of said total lamp current flows from said common ground through said leakage current path.

11. A circuit as claimed in claim 9, wherein said total current delivered to said lamp comprises a lamp current and a leakage current.

12. A circuit as claimed in claim 10, wherein said lamp current portion and said leakage current portion summing together at the top of said lamp and totaling said total lamp current.

13. A circuit as claimed in claim 9, wherein said leakage current path comprising a leakage capacitance generated by said lamp coupled to said common ground node.

14. A circuit as claimed in claim 9, wherein said current feedback loop comprising a first diode biased away from said bottom of said secondary side, a sense resistor between said first diode and said common node, and a second diode biased toward said bottom of said secondary side in parallel with said first diode and said sense resistor.

15. A circuit as claimed in claim 10, wherein said portion of said energy comprising the negative half-cycle of the AC signal generated by said secondary side.

16. A circuit as claimed in claim 9, wherein said common ground comprising a system circuit ground.

17. A circuit as claimed in claim 9, wherein said DC to AC converter circuit selected from the group comprising a push-pull inverter, a forward inverter, a flyback inverter, a half bridge inverter or a full bridge inverter.

18. A circuit as claimed in claim 9, wherein said inverter receiving said feedback signal proportional to the total current delivered to said lamp and adjusting the power delivered to said lamp.

19. A transformer circuit, comprising:
   a transformer having a primary side and a secondary side, said secondary side having a top and a bottom;

a lamp having a top, a bottom and a leakage current path, said lamp coupled in parallel to said secondary side of said transformer, said top of said secondary side electrically coupled to said top of said lamp;

a common ground connected to a ground node; and a current feedback loop generating a current feedback signal proportional to the total current delivered to said lamp;

said bottom side of said transformer electrically coupled to said ground node through said current feedback loop, said bottom of said lamp electrically coupled to said ground node and said leakage current path electrically coupled to said ground node;

wherein at least a portion of energy delivered by said transformer causing said total lamp current to flow from said bottom of said transformer through said current feedback loop to said common ground, a lamp current portion of said total lamp current flows from said common ground through said lamp, and a leakage current portion of said total lamp current flows from said common ground through said leakage current path.

20. A common grounding method, comprising:

coupling a top side of a transformer to a top side of a lamp;

coupling a common ground to a ground node; and coupling a feedback loop circuit to a bottom side of said transformer coupled and to said ground node;

coupling the bottom of said lamp said ground node; and coupling a leakage current path from said lamp to said ground node.

21. A method as claimed in claim 20, further comprising the step of:

generating a current feedback signal in said current feedback loop proportional to a total current delivered to said lamp.

22. A method as claimed in claim 21, further comprising the steps of:

causing said total lamp current to flow from said bottom of said transformer through said current feedback loop to said common ground;

generating a lamp current portion of said total lamp current flowing from said common ground through said lamp; and generating a leakage current portion of said total lamp current flowing from said common ground through said leakage current path.

23. A method as claimed in claim 21, further comprising the step of:

regulating power delivered to said lamp based on said a current feedback signal.

24. A transformer circuit, comprising:

a transformer having a primary side and a secondary side, said secondary side having a top and a bottom;

a lamp having a top, a bottom and a leakage current path, said lamp coupled in parallel to said secondary side of said transformer, said top of said secondary side electrically coupled to said top of said lamp;

a common ground connected to a ground node; and a current feedback loop generating a current feedback signal proportional to the total current delivered to said lamp;

said bottom side of said transformer electrically coupled to said ground node through said current feedback loop, said bottom of said lamp electrically coupled to said ground node and said leakage current path electrically coupled to said ground node; wherein said total current delivered to said lamp comprises a lamp current and a leakage current.

25. A transformer circuit, comprising:

a transformer having a primary side and a secondary side, said secondary side having a top and a bottom;

a lamp having a top, a bottom and a leakage current path, said lamp coupled in parallel to said secondary side of said transformer, said top of said secondary side electrically coupled to said top of said lamp;

a common ground connected to a ground node; and a current feedback loop generating a current feedback signal proportional to the total current delivered to said lamp;

said bottom side of said transformer electrically coupled to said ground node through said current feedback loop, said bottom of said lamp electrically coupled to said ground node and said leakage current path electrically coupled to said ground node;

wherein at least a portion of energy delivered by said transformer causing said total lamp current to flow from said bottom of said transformer through said current feedback loop to said common ground, a lamp current portion of said total lamp current flows from said common ground through said lamp, and a leakage current portion of said total lamp current flows from said common ground through said leakage current path and wherein said lamp current portion and said leakage current portion summing together at the top of said lamp and totaling said total lamp current.

26. An common ground circuit, comprising:

a transformer having a primary side and a secondary side, said secondary side having a top and a bottom;

a lamp having a top, a bottom and a leakage current path, said lamp coupled in parallel to said secondary side of said transformer, said top of said secondary side electrically coupled to said top of said lamp;

a common ground connected to a ground node; and a current feedback loop generating a current feedback signal proportional to the total current delivered to said lamp;

said bottom side of said transformer electrically coupled to said ground node through said current feedback loop, said bottom of said lamp electrically coupled to said ground node and said leakage current path electrically coupled to said ground node.

A capacitor divider in parallel with the secondary side of the transformer.

27. A circuit as claimed in claim 26, further comprising a voltage sense feedback loop coupled in parallel to said transformer through a capacitor divider circuit, said voltage sense feedback loop provides individual lamp ignition and over-voltage protection.

28. An LCD panel display, comprising:

a plurality of transformers each having a primary side and a secondary side, each said secondary side having a top and a bottom;

a plurality of lamps each having a top, a bottom and a leakage current path, each said lamp coupled in parallel to a respective said secondary side of said transformer, said top of each said secondary side electrically coupled to said top of each said lamp;

a common ground connected to a ground node; and a plurality of current feedback loops, each said feedback loop generating a current feedback signal proportional to the total current delivered to each said lamp;

said bottom side of each said transformer electrically coupled to said ground node through said current feedback loop, said bottom of said lamp electrically coupled to said ground node and said leakage current path electrically coupled to said ground node.

29. A computer system, comprising:

an LCD display panel comprising, a transformer having a primary side and a secondary side, said secondary side having a top and a bottom;

a lamp having a top, a bottom and a leakage current path, said lamp coupled in parallel to said secondary side of said transformer, said top of said secondary side electrically coupled to said top of said lamp;

a common ground connected to a ground node; and a current feedback loop generating a current feedback signal proportional to the total current delivered to said lamp;

said bottom side of said transformer electrically coupled to said ground node through said current feedback loop, said bottom of said lamp electrically coupled to said ground node and said leakage current path electrically coupled to said ground node.

\* \* \* \* \*